US008896916B2

(12) United States Patent
Barrett et al.

(10) Patent No.: US 8,896,916 B2
(45) Date of Patent: Nov. 25, 2014

(54) SYSTEM FOR FILTERING RADIO FREQUENCY AND INFRARED OPTICAL TRANSMISSIONS

(75) Inventors: Peter K. Barrett, Rockville, MD (US); David W. Avison, Townsend, MA (US); Steven Carlson, Cambridge, MA (US)

(73) Assignees: Madico, Inc., Woburn, MA (US); Optodot Corporation, Woburn, MA (US)

( * ) Notice: Subject to any disclaimer, the term of this patent is extended or adjusted under 35 U.S.C. 154(b) by 389 days.

(21) Appl. No.: 13/052,996

(22) Filed: Mar. 21, 2011

(65) Prior Publication Data

US 2012/0069429 A1 Mar. 22, 2012

Related U.S. Application Data

(63) Continuation of application No. PCT/US2009/057933, filed on Sep. 22, 2009.

(60) Provisional application No. 61/210,214, filed on Mar. 16, 2009, provisional application No. 61/192,951, filed on Sep. 22, 2008.

(51) Int. Cl.
| | | |
|---|---|---|
| *F21V 9/04* | (2006.01) | |
| *F21V 9/06* | (2006.01) | |
| *G02B 5/08* | (2006.01) | |
| *G02B 5/20* | (2006.01) | |
| *E06B 5/18* | (2006.01) | |
| *B32B 7/12* | (2006.01) | |
| *B32B 17/10* | (2006.01) | |
| *B32B 27/36* | (2006.01) | |

(52) U.S. Cl.
CPC ... *E06B 5/18* (2013.01); *B32B 7/12* (2013.01); *B32B 17/10* (2013.01); *B32B 17/10036* (2013.01); *B32B 17/10174* (2013.01); *B32B 27/36* (2013.01); *B32B 2367/00* (2013.01)
USPC ......................................................... 359/360

(58) Field of Classification Search
USPC ......... 359/359, 360, 355, 356, 811–830, 838, 359/871–883, 350, 577–580, 584–586, 359/589–590, 601, 609, 614
See application file for complete search history.

(56) References Cited

U.S. PATENT DOCUMENTS

| 4,512,864 A | 4/1985 | Gillery |
|---|---|---|
| 4,782,216 A | 11/1988 | Woodard |

(Continued)

FOREIGN PATENT DOCUMENTS

| EP | 2337915 A1 | 6/2011 |
|---|---|---|
| EP | 2337994 A1 | 6/2011 |

(Continued)

OTHER PUBLICATIONS

U.S. Appl. No. 13/052,991, David W. Avison et al., Window Films with Reflective Organic and Metal Layers, filed Mar. 21, 2011.

(Continued)

*Primary Examiner* — Stephone B Allen
*Assistant Examiner* — Tamara Y Washington
(74) *Attorney, Agent, or Firm* — Finch & Maloney PLLC

(57) ABSTRACT

A system of anti-surveillance security windows having one or more conductive glass substrates and one or more layers incorporating an organic radical cation compound, wherein the layers reflect in the infrared region, is demonstrated. Preferably, the organic radical cation compound is a salt of an aminium radical cation. The security windows may contain one or more layers of a multilayer interference stack of a metal/metal or metal/metal oxide design.

24 Claims, 1 Drawing Sheet

(56) References Cited

U.S. PATENT DOCUMENTS

| | | | |
|---|---|---|---|
| 5,132,161 A * | 7/1992 | Shibata et al. | 428/192 |
| 5,412,274 A | 5/1995 | Parham | |
| 5,510,575 A | 4/1996 | Weibler | |
| 6,248,815 B1 | 6/2001 | Papsin et al. | |
| 6,650,478 B1 * | 11/2003 | DeBusk et al. | 359/585 |
| 6,724,512 B2 | 4/2004 | Carlson et al. | |
| 6,997,981 B1 | 2/2006 | Coombs et al. | |
| 7,008,979 B2 | 3/2006 | Schottman et al. | |
| 7,151,626 B2 | 12/2006 | Carlson et al. | |
| 7,715,095 B2 | 5/2010 | Carlson et al. | |
| 2002/0141029 A1 | 10/2002 | Carlson et al. | |
| 2004/0130771 A1 | 7/2004 | Carlson | |
| 2007/0097510 A1* | 5/2007 | Carlson | 359/589 |
| 2008/0094695 A1 | 4/2008 | Simpson et al. | |
| 2011/0228385 A1 | 9/2011 | Avison et al. | |

FOREIGN PATENT DOCUMENTS

| | | |
|---|---|---|
| WO | 2010034030 A1 | 3/2010 |
| WO | 2010034033 | 3/2010 |

OTHER PUBLICATIONS

International Search Report, dated Mar. 25, 2010, received in International Patent Application No. PCT/US2009/057933, 2 pgs.

International Preliminary Report on Patentability, dated Mar. 22, 2011, received in International Patent Application No. PCT/US2009/057933, 6 pgs.

International Search Report received for PCT Patent Application No. PCT/US2009/057929, dated Mar. 25, 2010, 2 pages.

International Preliminary Report on Patentability and Written Opinion received from PCT Patent Appplication No. PCT/US2009/057929, dated Mar. 22, 2011, 6 pages.

* cited by examiner

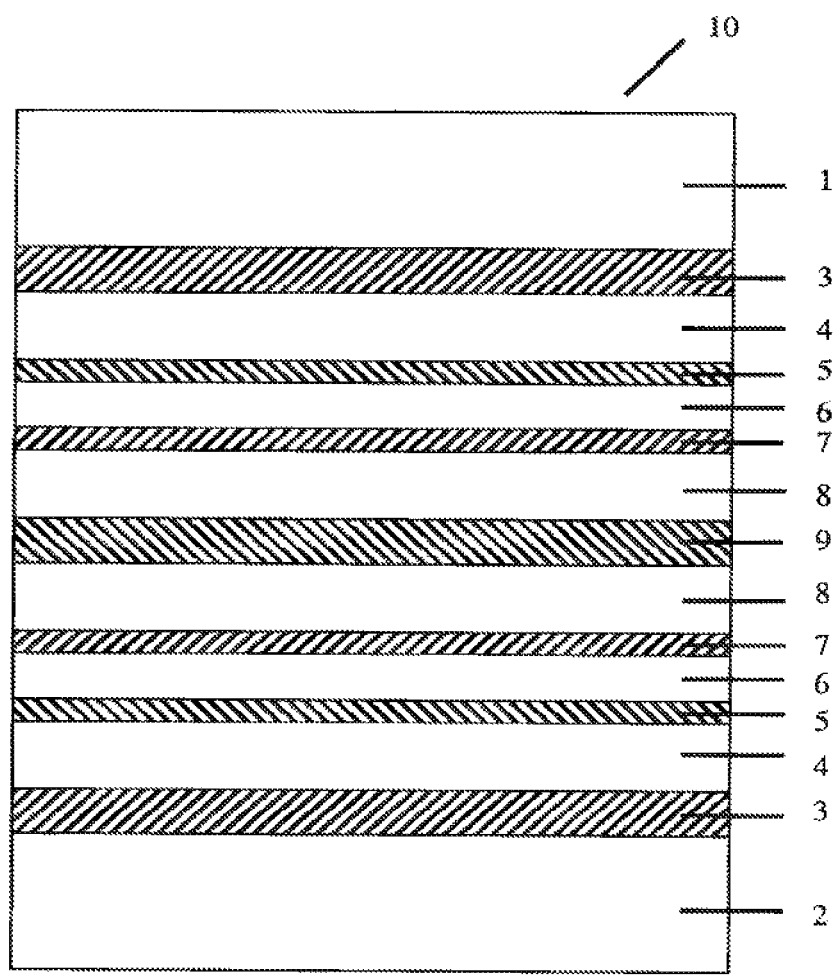

SYSTEM FOR FILTERING RADIO FREQUENCY AND INFRARED OPTICAL TRANSMISSIONS

CROSS-REFERENCE TO RELATED PATENT APPLICATIONS

This application is a Continuation of International Application No. PCT/US2009/57933, filed Sep. 22, 2009, and claims the benefit of U.S. Provisional Patent Application No. 61/210,214, filed on Mar. 16, 2009, in the United States Patent and Trademark Office, and U.S. Provisional Patent Application No. 61/192,951, filed on Sep. 22, 2008, in the United States Patent and Trademark Office. The entire contents of these applications are incorporated herein by reference.

FIELD OF THE INVENTION

The present invention relates generally to the field of windows, and particularly, pertains to security or anti-surveillance windows that block the transmission of radio frequency and infrared radiation. More specifically, this invention pertains to security windows comprising one or more conductive glass substrates. This invention also pertains to methods of making a security window by utilizing the one or more conductive glass substrates.

BACKGROUND OF THE INVENTION

There is a growing need for windows or other visually transparent openings in buildings that block against electromagnetic and infrared radiation in order to prevent the undesired collection of data from computer devices in the buildings. The level of blocking of electromagnetic and infrared radiation to provide the desired anti-surveillance security can vary over a wide range depending on the different security requirements. For the highest level of blocking, such as blocking of greater than 99% of the electromagnetic and infrared radiation, one challenge is to maintain an acceptable and as high as possible a transmission of visible light so that the normal function of the window for clarity and haze-free viewing is still provided. Another challenge is to readily obtain grounding of the electromagnetic blocking layers in the security window in order to achieve good electrical attenuation over a wide range of frequencies.

Since the 1990's, conductive glass windows from Pilkington have been sold under the trade name of DATASTOP for shielding against electromagnetic radiation in both laminated glass and insulating glass units. These conductive glass windows provide electromagnetic shielding for all but the most demanding data security applications, but do not provide sufficient infrared shielding for most anti-surveillance applications.

U.S. Pat. Nos. 6,859,310, 6,891,667, 7,177,075, 7,295,368 and 7,405,872 describe various approaches to designing security windows using a highly electrically conductive filter layer of a plurality of dielectric and metal layers with an infrared transmission at wavelengths between 780 nm and 2500 nm of no more than 50% and a sheet resistance of less than 4 ohms per square.

It would be advantageous to have a security window design that provides a combination of ease of grounding, electromagnetic and infrared shielding for the most demanding anti-surveillance applications, and high visible light transmittance and clarity.

SUMMARY OF THE INVENTION

This invention pertains to anti-surveillance security windows that block the transmission of radio frequency and infrared radiation. Preferably, the security windows comprise a conductive glass substrate, a layer of an organic free radical compound that is reflective at a range of wavelengths in the infrared, and/or a multilayer interference stack of a metal/metal or a metal/metal oxide design where the index of refraction of alternating layers is varied to provide a desired infrared reflectance and blocking.

One aspect of various embodiments of this invention pertains to an anti-surveillance security window comprising one or more conductive glass substrates and one or more layers comprising an organic free radical compound that is reflective at a range of wavelengths in the infrared. In one embodiment, the conductive glass substrate is a tin oxide conductive glass substrate. In one embodiment, the security window comprises two conductive glass substrates. In one embodiment, the security window is a laminated glass window. In one embodiment, the security window is an insulating glass window.

Another aspect of various embodiments of the present invention relates to an anti-surveillance security window comprising one or more conductive glass substrates, one or more layers comprising an organic free radical compound that is reflective at a range of wavelengths in the infrared, and one or more layers of a multilayer interference stack comprising alternating layers of a first metal and a second metal where the index of refraction of alternating layers is varied. In one embodiment, the security window comprises two layers of the multilayer stack comprising alternating layers of a first metal and a second metal. In one embodiment, at least one of the layers of the multilayer stack comprising alternating layers of a first metal and a second metal is positioned between the outside of the building and the one or more conductive glass substrates. In one embodiment, the resistance of the layer of a multilayer interference stack comprising alternating layers of a first metal and a second metal is greater than 4 ohms per square. In one embodiment, the resistance of the layer of a multilayer interference stack comprising alternating layers of a first metal and a second metal is greater than 6 ohms per square.

Still another aspect of this invention pertains to an anti-surveillance security window comprising one or more conductive glass substrates, one or more layers comprising an organic free radical compound that is reflective at a range of wavelengths in the infrared, and one or more layers of a multilayer interference stack comprising alternating layers of a metal and a metal oxide where the index of refraction of alternating layers is varied. In one embodiment, the security window comprises two layers of the multilayer stack comprising alternating layers of a metal and a metal oxide. In one embodiment, at least one of the layers of the multilayer stack comprising alternating layers of a metal and a metal oxide is positioned between the outside of the building and the one or more conductive glass substrates. In one embodiment, the resistance of the layer of a multilayer interference stack comprising alternating layers of a metal and a metal oxide is greater than 4 ohms per square. In one embodiment, the resistance of the layer of a multilayer interference stack comprising alternating layers of a metal and a metal oxide is greater than 6 ohms per square.

In one embodiment of the security windows of the present invention, at least one of the one or more layers comprising an organic free radical compound is positioned between the outside of the building and the one or more conductive glass substrates.

In one embodiment, the security window comprises (a) two layers comprising an organic free radical compound that is reflective at a range of wavelengths in the infrared and (b) two layers of a multilayer stack. In one embodiment, one of the layers of the multilayer stack is positioned between the outside of the building or structure that is being protected and the one or more layers comprising an organic free radical compound that is reflective at a range of wavelengths in the infrared.

In one embodiment of the security windows of this invention, the organic free radical compound is an aminium radical cation compound. In one embodiment, the aminium radical cation compound is a salt of an aminium radical cation, wherein the anion of the salt is selected from the group consisting of hexafluoroantimonate and hexafluorophosphate. In one embodiment, the aminium radical cation compound is a salt of a tetrakis(phenyl)-1,4-benzenediamine radical cation. In one embodiment, the aminium radical cation compound is a salt of a tris(phenyl)-aminium radical cation. In one embodiment, the one or more layers comprising an organic free radical compound exhibit a reflectance peak in the infrared region from 700 to 1700 nm. In one embodiment, the one or more layers comprising an organic free radical compound exhibit two reflectance peaks in the infrared region from 700 to 1700 nm.

In one embodiment of the security windows of this invention, the optical density spectrum of at least one of the one or more layers comprising an organic free radical compound exhibits a peak in the infrared region from 840 to 880 nm and, optionally, exhibits a second peak in the infrared region from 1250 to 1350 nm. In one embodiment, the percent transmission of at least one of the one or more layers comprising an organic free radical compound exhibits a minimum percent transmission peak of less than 20% in the infrared region from 840 to 880 nm and, preferably, further exhibits a percent transmission of less than 40% at 800 nm.

In one embodiment of the security windows of the present invention, the resistance of the conductive glass substrate is greater than 6 ohms per square. In one embodiment, the resistance of the conductive glass substrate is greater than 10 ohms per square.

BRIEF DESCRIPTION OF THE DRAWINGS

The accompanying drawings, together with the specification, illustrate exemplary embodiments of the present invention, and, together with the description, serve to explain the principles of the present invention.

FIG. 1 shows a schematic cross-sectional view of the security windows according to an embodiment of the present invention.

DETAILED DESCRIPTION OF THE INVENTION

In the following detailed description, only certain exemplary embodiments of the present invention have been shown and described, simply by way of illustration. As those skilled in the art would realized, the described embodiments may be modified in various different ways, all without departing from the spirit or scope of the present invention. Accordingly, the drawings and description are to be regarded as illustrative in nature and not restrictive. Like reference numerals designate like elements throughout the specification.

This invention pertains to anti-surveillance security windows that block the transmission of radio frequency and infrared radiation and, preferably, comprise a conductive glass substrate, a layer of an organic free radical compound that is reflective at a range of wavelengths in the infrared, and/or a multilayer interference stack of a metal/metal or a metal/metal oxide design where the index of refraction of alternating layers is varied to provide a desired infrared reflectance and blocking Conductive Glass Substrates The conductive glass substrates of various embodiments of this invention have preferred properties, such as, for example, very low haze and high visible light transmission and clarity, for use in windows in buildings. They also have a high electrical conductivity that provides blocking or shielding of electromagnetic radiation, typically by reflecting this radiation. An example of such a conductive glass substrate is TEC 15, a trade name for a fluorine-doped tin oxide glass available from Pilkington. TEC 15 has a resistance of about 12 to 14 ohms per square and a % haze of less than 0.75%. Its visible light transmittance is about 82 to 84%. Its blocking in the infrared region at 800 nm is about 35%, so that even two TEC 15 glass substrates only collectively block about 58% of the 800 nm infrared radiation. This is far below the greater than 99% blocking of the 800 nm radiation that is desired in many anti-surveillance data security applications. Another example of such a conductive glass substrate is TEC 7 from Pilkington. TEC 7 is an electrically conductive glass with a resistance of about 8 ohms per square. The TEC 15 conductive glass substrates, even singly or doubly, provide good blocking of electromagnetic radiation, but, for some data security applications, even greater attenuation or blocking of the electromagnetic radiation across a wide frequency range is desired.

Organic Free Radical Compounds

The term "organic free radical compound," as used herein, pertains to an organic compound which comprises at least one free unpaired electron on an atom, such as, for example, a carbon atom, a nitrogen atom, or an oxygen atom, in the ground state of the organic compound. Suitable organic free radical compounds for the infrared blocking layers, anti-surveillance security windows, and other product applications of various embodiments of the present invention include neutral organic free radicals, salts of organic free radical cations, and salts of organic free radical anions. For purposes of brevity, the terms "organic free radical cation," "organic radical cation," and "radical cation" are used interchangeably herein. The word "cation," as used herein, pertains to a positively charged atom in a molecule, such as, for example, a positively charged nitrogen atom. The word "anion," as used herein, pertains to a negatively charged atom in a molecule, such as, for example, a negatively charged oxygen atom. It should be noted that the free unpaired electron and the positive and negative charges of the organic free radical compounds may be localized on a single atom or shared among more than one atom.

Examples of suitable salts of organic free radical cations for the infrared blocking layers, security windows, and other product applications of this invention include, but are not limited to, salts of aminium radical cations, such as, for example, tris(p-dibutylaminophenyl)aminium hexafluoroantimonate, which is commercially available as IR-99, a trade name for a dye available from Sperian Protection, Smithfield, R.I. An equivalent chemical name for IR-99, used interchangeably herein, is the hexafluoroantimonate salt of N,N-dibutyl-N',N'-bis[4-(dibutylamino)phenyl]-1,4-benzenediamine radical cation. IR-99 is known to be a stable material that may exist in a layer of material, such as in a polymeric coating, under normal room conditions for an extended period of time. Another suitable salt of an aminium radical cation compound is IR-165, which is a trade name for a dye available from Sperian Protection, Smithfield, R.I. IR-165 is the hexafluoroantimonate salt of a tetrakis(phenyl)-1,4-benzenediamine radical cation. IR-165 is likewise known to be stable in the dry powder form and in a layer of material, such as in a polymer-containing coating, under ambient room conditions for extended periods of time, such as for many years. These compounds are used in various embodiments of the present invention because of their infrared reflectance, high visible transparency, and excellent stability to light and heat.

Coatings comprising aminium radical cation compounds have been found to exhibit high levels of reflectance in the infrared, as described in U.S. Pat. No. 7,151,626, to Carlson, and in U.S. Pat. Publ. Applic. No. 20070097510, to Carlson et al. Layers comprising IR-165 have a much lower absorption in the 400 to 700 nm wavelength region of the visible than does IR-99 for a comparable amount of infrared blocking, and thus are preferred for window applications where high visible transmission is desired.

The terms "infrared," "infrared region," "near-infrared wavelength region," "near-infrared wavelength," and "near-infrared," are used interchangeably herein, and pertain to wavelengths from 700 nm to 2500 nm. The terms "visible wavelength region," "visible wavelength," "visible region," and "visible," are used interchangeably herein and pertain to wavelengths from 400 to 700 nm.

Suitable salts of organic radical cations for the infrared blocking layers, security windows, and other product applications of various embodiments of this invention include, but are not limited to, salts of an aminium radical cation compound. The choice of the counteranion for the salt depends on a variety of factors such as, for example, the ease and cost of applying the infrared blocking layer and the required stability of any infrared blocking layers where the organic radical cation salt is utilized, against degradation by oxygen, moisture, and photon exposures.

Chart 1 shows the chemical structure of IR-99, a representative free radical compound for the infrared blocking layers of various embodiments of this invention. IR-99 is an example of a salt of a tris(4-dialkylaminophenyl)aminium radical cation.

Chart 1

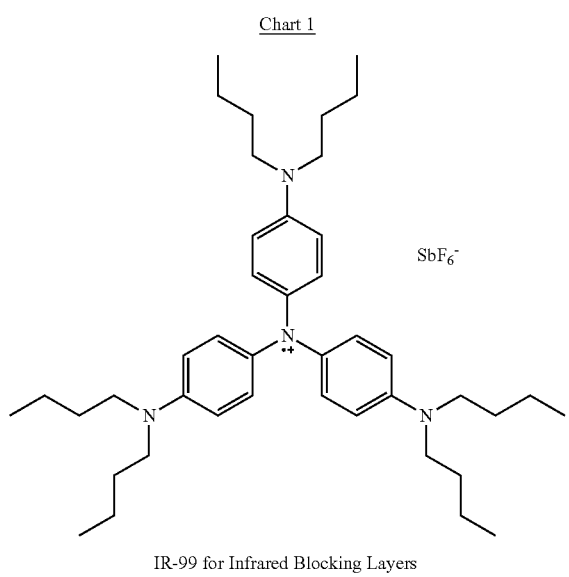

IR-99 for Infrared Blocking Layers

It can be seen in Chart 1 that IR-99 is an organic free radical compound with a single free electron shown on one of the nitrogen atoms. It is present in a salt form with a hexafluoroantimonate anion in this case.

In one embodiment of the security windows of this invention, the aminium radical cation compound is a salt of an aminium radical cation, wherein the anion of the salt is selected from the group consisting of hexafluoroantimonate and hexafluorophosphate. In one embodiment, the aminium radical cation compound is a salt of a tetrakis(phenyl)-1,4-benzenediamine radical cation. In one embodiment, the aminium radical cation compound is a salt of a tris(phenyl)-aminium radical cation.

Multilayer Interference Stacks

Layers of multilayer interference stacks on plastic films, such as polyester films, are sold for use in solar control window films because of their high level of infrared reflectance and blocking and their relatively high visible light transmission. Because of their high electrical conductivity, they also provide some shielding of electromagnetic radiation. An example of this type of multilayer interference stack on polyester film is XIR-70, the trade name for a window film available from Southwall, Palo Alto, Calif. Typically, these multilayer interference stacks are comprised of alternating layers of a first metal and a second metal where the alternating layers vary in the index of refraction. One of the metals used is typically silver. As an alternative, the second metal layer in the interference stack can be replaced by a metal oxide. These window films typically have low resistances of under 10 ohms per square and sometimes of under 4 ohms per square. Although these types of window films have found some commercial use in security windows since the 1990's, they can be problematical to ground to the window frame to achieve effective electromagnetic shielding. Also, these window films with interference stacks typically have strong infrared reflectance and blocking properties above 850 nm, but are not nearly as strong in blocking at 780 nm and 800 nm, which are the low end of the blocking wavelengths required in many data security applications.

Security Windows

The security windows of various embodiments of the present invention comprise a conductive glass substrate, a layer of an organic free radical compound that is reflective in the infrared, and, optionally, a layer of a multilayer interference stack of a metal/metal and/or a metal/metal oxide design, as described herein. The layer of an organic free radical compound typically contains the organic free radical compound, such as the salt of an aminium compound, and a polymeric binder, such as for example a urethane polymer at a 30:70 ratio to the amount of organic free radical compound, for added adhesion and cohesion of the coating layer. This layer is coated onto a substrate, such as a polyethylene terephthalate or polyester film as is commonly used in solar control window films, or is coated on another coating layer on a substrate, such as a polyester film. Thus, the organic free radical compound, such as the aminium compound, is present in a distinct single coating layer on the surface of a substrate or on another coating layer that is on a substrate. Similarly, the multilayer interference stack layer, if present, is coated in the multiple layers of the stack layer onto a substrate, such as a polyester film, or is coated on another coating layer that is on a substrate, such as a polyester film. These coated substrates having organic free radical compound layers and, optionally, multilayer interference stack layers can be combined into a laminate suitable for fabricating into the final security window glass configuration, where necessary, by, for example, laminating them together using a pressure sensitive or other adhesive.

The security windows of various embodiments of this invention can be fabricated into any window glass configuration known in the art, such as, for example, into laminated glass windows using, for example, a polyvinyl butyral (PVB) polymer to laminate the glass substrates to other layers of the security window or into insulating glass or thermopane configurations where there is an air gap in the interior of the window. One of the advantages of the layers of an aminium radical cation compound, such as IR-165, of various embodiments of this invention is that they are stable to the high heats utilized in laminating glass with PVB and other polymers. The security windows of the present invention may be connected electrically to the metal frame of the window, preferably connected to the total periphery of the glass, by conducting gaskets and other methods known in the art of DATASTOP and other anti-surveillance window glass. The metal frame in turn should be connected to the electromagnetic screening material in the wall.

Preferably, the one or more conductive glass substrates are positioned on the side of the one or more layers of an organic free radical compound and on the side of the layers of the multilayer interference stack that is opposite from the outside of the building or other enclosure that is being protected from surveillance from the outside. Besides buildings, examples of other enclosures that may utilize the security windows of this invention include, but are not limited to, rooms, cabinets, instrument panels, and computer screens. Because the conductive glass substrate is typically not reflective in the infrared and has some absorption of the infrared, this configuration of the conductive glass substrates in the security window enhances the amount of reflection of the infrared radiation that reaches to the outside from the other layers and, where necessary, keeps the absorption of the infrared radiation, such as from the sun, down, in order to prevent heat buildup in the glass that might contribute to cracking of the glass.

For increased shielding of electromagnetic radiation, it is preferable to use two layers of the conductive glass substrate. If the one or more layers of the multilayer interference stack are used, it is preferable to use two layers for increased shielding of both the infrared and electromagnetic radiation. The use of the conductive glass substrates reduces the need for low electrical resistance, such as below 4 ohms per square, in the one or more layers of the multilayer interference stack. For both types of the multilayer interference stack of the security windows of this invention, the resistance of the layer of the multilayer interference stack may be above 4 ohms per square, and preferably above 6 ohms per square.

In the security windows of various embodiments of the present invention, it is preferred to use two layers of the organic free radical compound in order to make the layers thinner and to have less overall haze in the security window, while achieving the desired level of infrared blocking. The one or more layers of the organic free radical compound, such as a salt of an aminium radical cation compound, are primarily present to provide effective shielding in the infrared in the region of 700 to 850 nm, and particularly around 800 nm, without significantly decreasing the visible light transmittance and clarity. In the security windows of various embodiments of this invention, about 35 to 70% of the shielding at 800 nm is typically provided by the one or more layers of the organic free radical compound. In one embodiment, the layer of the organic free radical compound has a reflectance peak in the 700 to 1700 nm wavelength region, and preferably has two reflectance peaks in the 700 to 1700 nm wavelength region. Typically, the % reflectance at these peaks is above 20% and may be over 30% at one of the peaks. Preferably, at least one of the reflectance peaks is in the 700 to 900 nm infrared region. In one embodiment, at least one of the reflectance peaks is in the 1200 to 1400 nm infrared region.

In one embodiment of the security windows of this invention, the optical density spectrum of at least one of the one or more layers comprising an organic free radical compound exhibits a peak in the infrared region from 840 to 880 nm and, optionally, exhibits a second peak in the infrared region from 1250 to 1350 nm. In one embodiment, the percent transmission of at least one of the one or more layers comprising an organic free radical compound exhibits a minimum percent transmission peak of less than 20% in the infrared region from 840 to 880 nm and, preferably, further exhibits a percent transmission of less than 40% at 800 nm.

FIG. 1 shows a cross-section view of one embodiment of the security windows of this invention. The security window 10 has a glass 1 on the side facing the outside of the protected building or enclosure and a conductive glass 2 on the side facing the interior of the building or enclosure. These glass substrates are laminated into the security window 10 further comprising laminating adhesive layers 3, polyester film substrates 4, multilayer interference stack layers 5, pressure sensitive adhesive layers 6, layers 7 comprising a free radical cation compound, polyester film substrates 8, and pressure sensitive adhesive layer 9.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A security window comprising a metal frame; one or more conductive glass substrates; and one or more layers comprising an organic free radical compound that is reflective at a range of wavelengths in the infrared; wherein said organic free radical compound is an aminium radical cation compound and wherein the metal frame is electrically connected to the one or more conductive glass substrates.

2. The security window film of claim 1, wherein said one or more conductive glass substrates is a tin oxide conductive glass substrate.

3. The security window of claim 1, wherein said security window comprises two conductive glass substrates.

4. The security window of claim 1, wherein said security window is a laminated glass window.

5. The security window of claim 1, wherein said security window is an insulating glass window.

6. The security window of claim 1, wherein said security window further comprises one or more layers of a multilayer interference stack comprising alternating layers of a first metal and a second metal where the index of refraction of alternating layers is varied.

7. The security window of claim 6, wherein said security window comprises two layers of a multilayer interference stack comprising alternating layers of a first metal and a second metal where the index of refraction of alternating layers is varied.

8. The security window of claim 6, wherein at least one of said one or more layers of a multilayer interference stack comprising alternating layers of a first metal and a second metal is positioned between the outside of a building and said one or more conductive glass substrates.

9. The security window of claim 6, wherein the resistance of the layer of a multilayer stack comprising alternating layers of a first metal and a second metal is greater than 4 ohms per square.

10. The security window of claim 6, wherein the resistance of the layer of a multilayer stack comprising alternating layers of a first metal and a second metal is greater than 6 ohms per square.

11. The security window of claim 1, wherein said security window further comprises one or more layers of a multilayer interference stack comprising alternating layers of a metal and a metal oxide where the index of refraction of alternating layers is varied.

12. The security window of claim 11, wherein said security window comprises two layers of a multilayer interference stack comprising alternating layers of a metal and a metal oxide where the index of refraction of alternating layers is varied.

13. The security window of claim 11, wherein at least one of said one or more layers of a multilayer interference stack comprising alternating layers of a metal and a metal oxide is positioned between the outside of a building and said one or more conductive glass substrates.

14. The security window of claim 11, wherein the resistance of the layer of a multilayer stack comprising alternating layers of a metal and a metal oxide is greater than 4 ohms per square.

15. The security window of claim 11, wherein the resistance of the layer of a multilayer stack comprising alternating layers of a metal and a metal oxide is greater than 6 ohms per square.

16. The security window of claim 1, wherein said security window comprises two layers comprising an organic free radical compound that is reflective at a range of wavelengths in the infrared.

17. The security window of claim 1, wherein said one or more layers comprising an organic free radical compound are positioned between the outside of a building and said one or more conductive glass substrates.

18. The security window of claim 1, wherein said aminium radical cation compound is a salt of an aminium radical cation, wherein the anion of said salt is selected from the group consisting of hexafluoroantimonate and hexafluorophosphate.

19. The security window of claim 1, wherein said aminium radical cation compound is a salt of a tetrakis(phenyl)-1,4-benzenediamine radical cation.

20. The security window of claim 1, wherein said aminium radical cation compound is a salt of a tris(phenyl)-aminium radical cation.

21. The security window of claim 1, wherein the resistance of the conductive glass substrate is greater than 6 ohms per square.

22. The security window of claim 1, wherein the resistance of the conductive glass substrate is greater than 10 ohms per square.

23. The security window of claim 1, where said one or more layers comprising an organic free radical compound exhibit a reflectance peak in the infrared region from 700 to 1700 nm.

24. The security window of claim 1, where said one or more layers comprising an organic free radical compound exhibit two reflectance peaks in the infrared region from 700 to 1700 nm.

* * * * *